(No Model.)
S. WALTER.
SAW TIGHTENER.
No. 395,367. Patented Jan. 1, 1889.
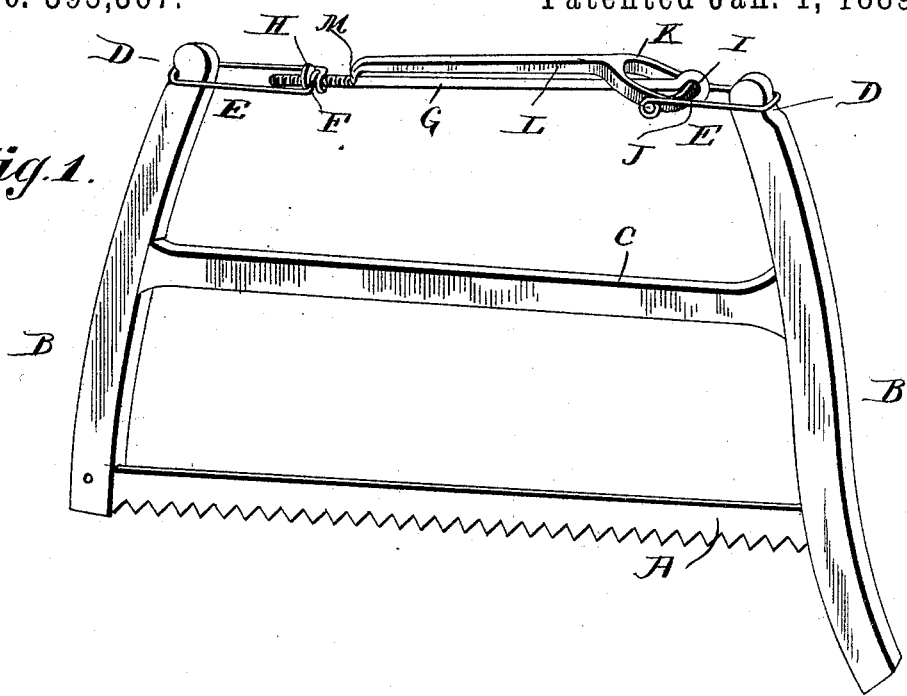
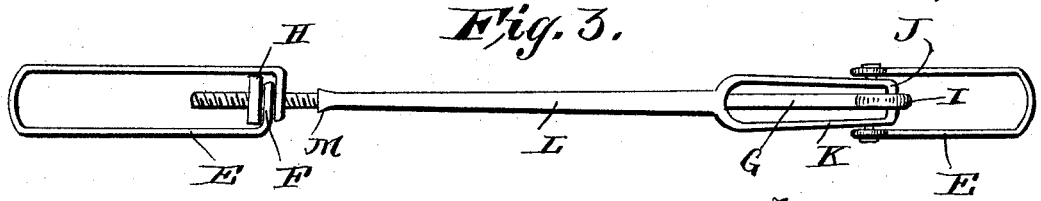
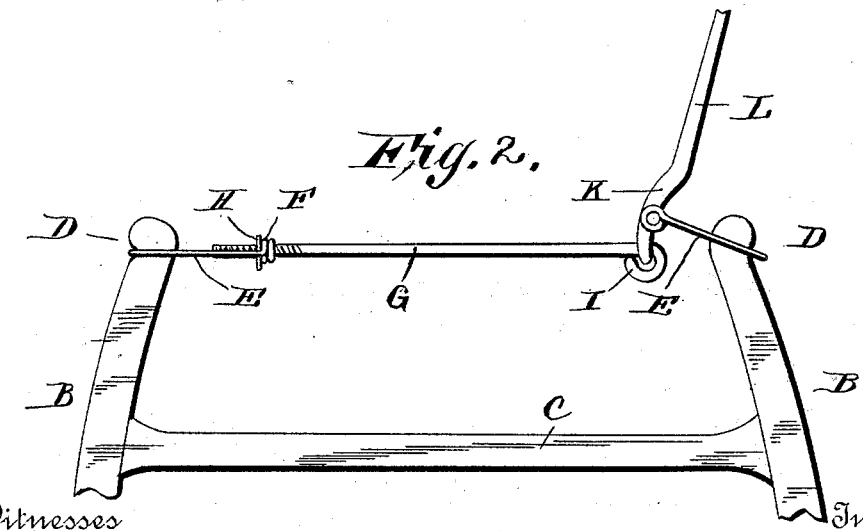
Witnesses
Frank J. Ott
R. W. Bishop
Inventor
Samuel Walter
By his Attorneys
C. A. Snow

UNITED STATES PATENT OFFICE.

SAMUEL WALTER, OF DALLAS CITY, ILLINOIS.

SAW-TIGHTENER.

SPECIFICATION forming part of Letters Patent No. 395,367, dated January 1, 1889.

Application filed August 13, 1888. Serial No. 283,123. (No model.)

*To all whom it may concern:*

Be it known that I, SAMUEL WALTER, a citizen of the United States, residing at Dallas City, in the county of Hancock and State of Illinois, have invented a new and useful Improvement in Saw-Tighteners, of which the following is a specification.

My invention relates to saw-tighteners; and it consists in certain novel features hereinafter described and claimed.

In the accompanying drawings, Figure 1 is a perspective view showing the lever thrown down and the saw tightened. Fig. 2 is a side elevation showing the lever raised. Fig. 3 is a detailed plan view of the tightener removed from the saw.

Referring to the drawings by letter, A designates the saw-blade, B B the handles, and C the cross-bar, all of the usual construction. The upper ends of the handles are provided with shoulders D D on their outer sides, and these shoulders are engaged by bails or loops E E, as shown. These bails or loops are of unequal length, and are formed of stout wire passed around the upper ends of the handles and engaging under the shoulders D, as clearly shown. The longer bail has its inner ends bent inward toward and past each other, and provided with loops F, through which the stretching-bar G is passed. The said stretching-bar has a threaded extremity, and is provided with a tightening-nut, H, on said threaded portion, which bears against the loop F, and is adapted to be turned upward, so that the stretching-bar will exert the proper tension on the bails when the lever is thrown downward. The opposite end of the stretching-bar is provided with an eye, I, through which a cross-bar, J, at the end of the fork K on the end of the stretching-lever L passes. The free end of the lever L is provided with a pair of prongs, M, which pass down on opposite sides of the stretching-bar when the lever is thrown down. The smaller bail or loop has its ends pivoted to the opposite sides of the fork K, between the cross-bar J thereof and the free end of the lever, and the said fork K is given a slightly curved formation, so that when the lever is thrown downward the fork will be permitted to pass around the stretching-bar and bring the ends of the said bar and the adjacent bail or loop into the same horizontal plane.

In operation the bails or loops are engaged under the shoulders of the handles, as shown and as before stated, and the lever is then thrown downward, so as to rest on the tightening-bar, as shown in Fig. 1. The upper ends of the handles will thus be drawn toward each other, and the lower ends forced apart, thereby stretching the saw-blade and holding the same firm, so as to prevent buckling. When the lever is thrown up, as shown in Fig. 2, the inner end of the shorter bail or loop E will be thrown toward the adjacent handle, and the tension of the said bails or loops thereby released. When the lever is drawn downward, the inner end of said bail or loop will be drawn inward past the end of the tightening-bar, and thereby caused to draw on the handles. When the lever is in its lowest position, the ends of the tightening-bar and the inner pivoted ends of the shorter loop will be approximately in the same horizontal plane, so that the lever will be thereby locked against undue vertical movement. The prongs at the free end of the lever pass downward on opposite sides of the tightening-bar, as before stated, and thereby prevent lateral movement or twisting of the lever.

From the foregoing description it will be seen that I have provided a very simple and efficient saw-tightener, by the use of which the saw-blade can be quickly straightened and the handles thrown apart, so as to remove broken saw-blades.

In the present application I make no claim to the threaded construction of the tightening-bar and the adjusting-nut mounted thereon, that feature being shown in a former patent, No. 368,632, granted to me, on which the present device is an improvement.

My present invention resides, principally, in the construction of the lever. It will be observed that in my present device the lever, when thrown downward, is arranged over the stretching-bar, so that less space is occupied by the tightening devices than in my former patent, the result being that the present device is not so liable to be accidentally disengaged and the tension released. It will be further observed that in my present device the stretching-bar is pivoted on an integral cross-bar of the fork at the end of the lever, instead of on a separate pin, as in my former patent. The present arrangement provides a stronger attachment, and is also more durable, as the separate pin is liable to be lost. My present device requires less metal, and is consequently cheaper than my former device, and its parts are simpler and more compactly arranged.

Having thus described my invention, what I claim, and desire to secure by Letters Patent, is—

The combination of the handles, the loops or bails engaging the upper ends of the handles, the stretching-bar having one end connected to the ends of one of the loops and its opposite end entering the end of the other loop, and the lever having a fork, K, at its end, provided with an integral cross-bar, J, the end of the stretching-bar being pivoted on the said cross-bar J and the ends of the adjacent bail being pivoted on the sides of the fork at a point between the cross-bar J and the end of the lever, as set forth.

In testimony that I claim the foregoing as my own I have hereto affixed my signature in presence of two witnesses.

SAMUEL WALTER.

Witnesses:
JAMES T. ANDERSON,
P. E. WALTER.